Jan. 13, 1959

T. A. RICH 2,868,968

LOGARITHMIC TRANSLATING CIRCUIT

Filed Feb. 2, 1953

Inventor:
Theodore A. Rich,
by Paul A. Frank
His Attorney.

Jan. 13, 1959
T. A. RICH
2,868,968
LOGARITHMIC TRANSLATING CIRCUIT
Filed Feb. 2, 1953
2 Sheets-Sheet 2
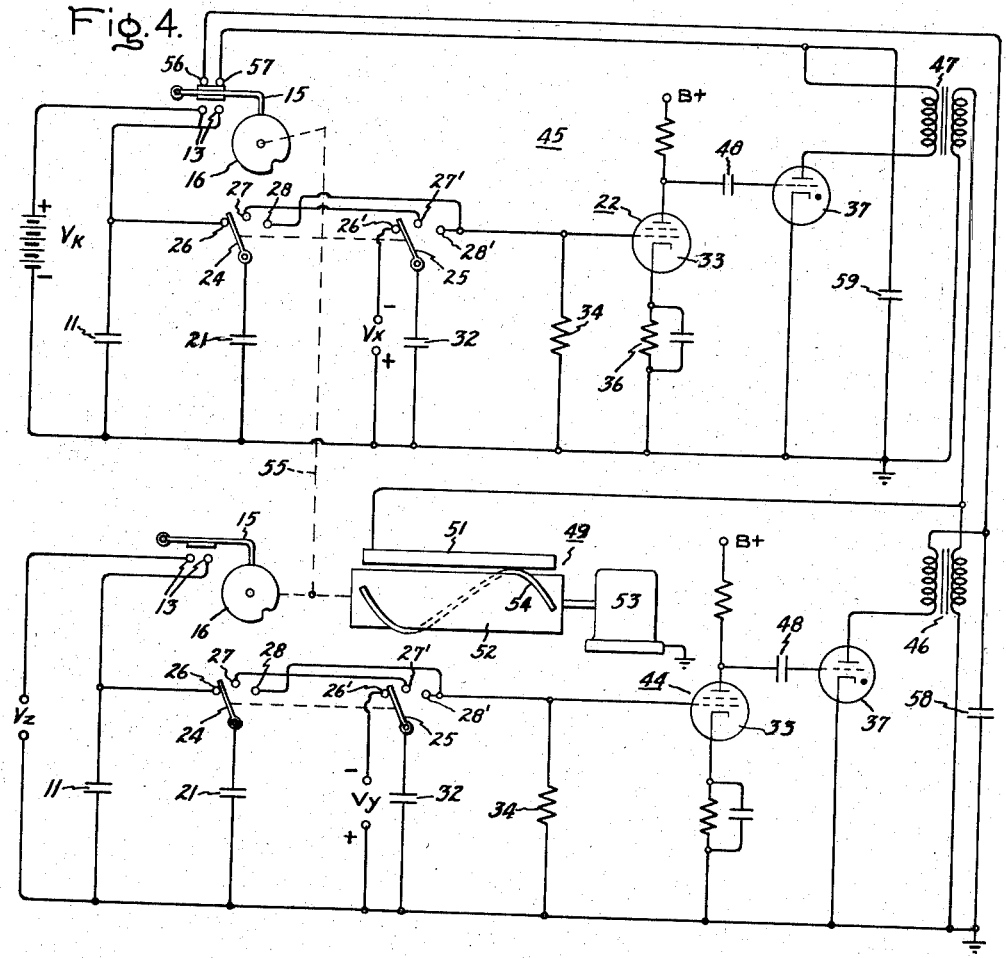
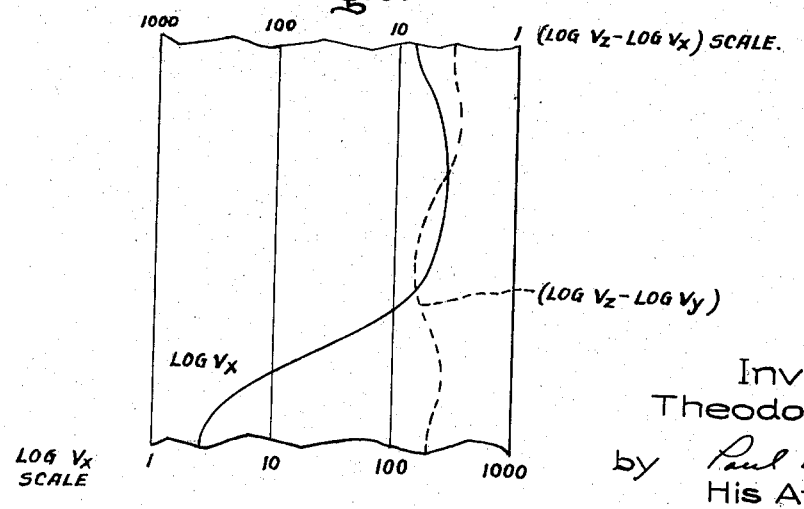
Inventor:
Theodore A. Rich,
by Paul A. Frank
His Attorney.

United States Patent Office 2,868,968
Patented Jan. 13, 1959

2,868,968

LOGARITHMIC TRANSLATING CIRCUIT

Theodore A. Rich, Schenectady, N. Y., assignor to General Electric Company, a corporation of New York Application February 2, 1953, Serial No. 334,393

9 Claims. (Cl. 250—27)

The present invention relates to a logarithmic translating circuit.

More particularly, the invention relates to a logarithmic translating circuit for use in deriving an output signal which is proportional to the logarithm of a signal applied to the input of the circuit.

In a large number of detection and measuring activities in the field of communications and acoustics, it is quite often desirable for the detection and measurement instruments used to develop output signals which are logarithmically related to the signals applied to their input. By designing the instruments to respond in this fashion, the structure of the moving indicating element of the instruments can be greatly simplified, and further, the information developed by the instrument can be directly applied to a large number of different types of indicating means, such as a recording instrument, or a cathode ray oscilloscope, to obtain thereby different kinds of records of the phenomena being measured. There are a large number of known logarithmic translating circuits, all of which utilize some element in their structure to develop a logarithmic response to an input signal. A number of these known logarithmic translating circuits utilize the inherent exponential charging or discharging characteristic with time of resistance-capacitance or resistance-inductance networks, to develop the logarithmically related output signals produced thereby. While the known logarithmic translating circuits of this type have been satisfactory for certain applications, their use has been restricted due to certain undesirable characteristics inherent in their design. A particular source of trouble with logarithmic translating circuits of this type has been the distortion of the exponential response characteristic of the logarithmically responsive element of the circuit by reason of the loading effect of the output signal deriving portions of the circuit on such element. Further, because of the structural characteristics of known logarithmic translating circuits of this type, difficulty has been experienced in developing a circuit which is capable of reliable operation throughout a substantial operating life. Additionally, heretofore, none of the logarithmic translating systems available in the art have been capable of providing an output signal which is related to the logarithm of the combined value of at least three varying electric signals applied to the input of the system.

It is therefore one object of the present invention to provide a new and improved logarithmic translating circuit for producing an output signal that is related to the logarithm of a signal applied to the input of the circuit.

Another object of the invention is to provide a logarithmic translating circuit which has a true logarithmic response characteristic over a desired range of signal values, such response characteristic being unaffected by load elements attached to the circuit.

Still another object of the invention is to provide a sensitive and reliable logarithmic translating circuit that will respond accurately to the input signal applied thereto throughout a substantial operating life.

A further object of the invention is to provide a logarithmic translating circuit having the above set forth characteristics, and which is relatively simple and inexpensive to construct.

A still further object of the invention is to provide a logarithmic translating system for deriving an output signal which is proportional to the logarithm of the combined value of at least three input signals.

A feature of the invention is the provision of a logarithmic translating circuit which includes a first electrical energy storage device that has a relatively large capacity. Operatively connected to the first electrical energy storage device is a means for charging the device to a selected energy level. Also associated with the first energy storage device is a second electrical energy storage device that has a comparatively small capacity with relation to the first energy storage device, and an output circuit. The translating circuit further includes a switching means along with suitable electrical connections for cyclically coupling the second energy storage device in circuit relationship with the first energy storage device, and sequentially to uncouple the storage devices, and to couple the second energy storage device in circuit relationship with the output circuit to develop thereby exponentially varying energy levels in the output circuit.

Another feature of the invention is the provision of a logarithmic translating system for obtaining the combined value of the logarithm of at least three varying energy values, which system includes a first and a second logarithmic translating channel. Each of the channels includes an electrical energy storage device having a relatively large capacity, and an output circuit which can be operatively connected to each of the translating channels for utilizing the energies developed thereby. Associated with the first energy storage device of the first channel is a means for charging the device to a selected value, and associated with the first energy storage device of the second channel is a means for charging the device to an energy value equal to the instantaneous value of one of the plurality of energy values to be combined. Provided in the first channel is a means for operatively coupling the electrical energy storage device thereof in circuit relationship with a point maintained at the instantaneous energy level of one of the remaining energy values to be combined, and with the input of the respective first channel output circuit. Similarly, means are provided in the second channel for operatively coupling the electrical energy storage device thereof in circuit relationship with a point maintained at the instantaneous energy level of the last remaining energy values to be combined, and with the input of the respective second channel output circuit. Additionally, a common output circuit is coupled to the output circuits of both the first and second logarithmic translating channels described above.

Other objects, features, and many of the attendant advantages of this invention will be appreciated more readily as the same becomes understood by reference to the following detailed description, when considered in connection with the accompanying drawings, wherein like parts in each of the several figures are identified by the same reference character, and wherein.

Figure 1:
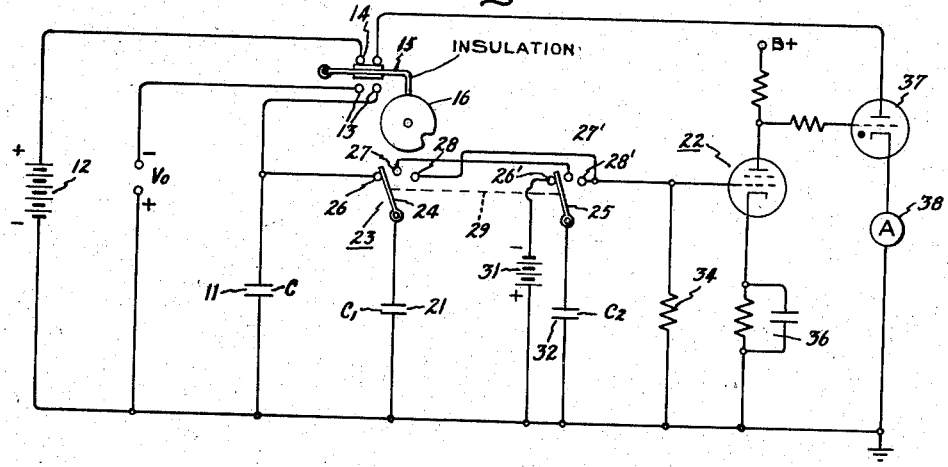
Fig. 1 is a schematic circuit diagram of a logarithmic translating circuit constructed in accordance with the invention.

Fig. 4 is a circuit diagram of a logarithmic translating system that utilizes the novel logarithmic translating circuit illustrated in Fig. 1, and that is capable of deriving an output record of the combined value of at least three varying electric signals applied to the input of the system; and Fig. 5 is a plan view of a portion of the length of a permanent record obtained on a roll of electrically sensitive recording paper with the logarithmic translating system of Fig. 4.

The logarithmic translating circuit illustrated in Fig. 1 includes a first electrical energy storage device 11 which preferably comprises a polyethylene capacitor having relatively large capacitances. The first capacitor 11 is adapted to be cyclically charged to a selected electric potential of energy value by a cam-operated switch 13 that serves to couple capacitor 11 across a source of electric potential $V_0$ having a known value, upon the contacts thereof being closed. The cam-operated switch 13 may be actuated by means of an electrically conductive lever arm having an electrically insulated cam rider 15 secured to the end thereof which rides upon the surface of a rotatable cam 16 having a depression in its periphery. The depression in cam 16 (upon being aligned with a cam rider) allows the contacts of switch 13 to be closed, thereby causing the first capacitor 11 to be charged to an electric potential equal to the potential $V_0$.

Also included in the translating circuit is a second electrical energy storage device 21 that preferably comprises a capacitor having a comparatively small capacitance $C_1$ with relation to the first energy storage device 11. The second energy storage device 21 is adapted to be connected to an output circuit, indicated at 22 through a switching means which preferably comprises a pair of synchronously-operated, movable switch arms 24 and 25 that are adapted to engage sequentially a desired one of a plurality of fixed contacts 26, 27, 28 or 26', 27', 28' respectively. Movable switch arms 24 and 25 may comprise the movable armatures of a pair of synchronously operated, vibrating reed type mechanical switches that are operated in synchronism by means of a common electrical exciting circuit, or if desired, may be tied together through a mechanical interconnection indicated by the dotted lines at 29. The movable switch arms 24 and 25 of the switching means are operated at a frequency which is substantially greater than the frequency at which the first capacitor 11 is cyclically charged by the cam operated switch 13 and are adapted to sequentially close on the fixed contacts 26 and 26' then the fixed contacts 27 and 27' which are flexible, and finally the fixed contacts 28 and 28' respectively, in synchronism. The fixed contact 26 is connected across electrical energy storage device 11 and upon the movement of switch arm 24 thereagainst, the second electrical energy storage device 21 is operatively connected in circuit relationship with its associated first energy storage device 11. Simultaneously, with the above operation the movable switch arm 25 of the switching means moves against the fixed contact 26' that is connected to a reference source of direct current electric energy 31 having a value $V_g$. The movable arm 25 of the switching means is connected to a third energy storage device 32 that preferably comprises a capacitor having a value of capacitance substantially equal to that of the second capacitor 21. With this arrangement, whenever the movable switch arms 24 and 25 engage their associated contacts 26 and 26' respectively, the second electrical energy storage device 21 is charged to an energy level proportional to the energy content of the first electrical energy storage device 11, and the third electrical energy storage device 32 is charged to an energy level proportional to the electrical energy level $V_g$ of the source 31. Thereafter the movable arms 24 and 25 of the switching means are disengaged from fixed contacts 26 and 26', respectively and sequentially engage fixed contacts 27 and 27', respectively. Fixed contacts 27 and 27' are flexibly mounted, and are electrically interconnected in a manner such that the second and third energy storage devices are directly connected in electrical circuit relationship with each other. The electrical circuit thus formed, constitutes a differential voltage divider so that the charge on one of the storage devices tends to equalize the charge on the other. Upon further movement of the movable arms 24 and 25, the flexible fixed contacts 27 and 27' are flexed toward and engage the fixed contact points 28 and 28' respectively, so that the voltage divider thus constituted is operatively coupled to the control grid of an electron discharge tube 22 having a grid biasing resistor 34 connected between the control grid thereof and ground. The cathode electrode of tube 33 is connected to ground through a second grid biasing circuit 36, and the plate thereof is connected to the control grid of a gas discharge tube 37. Gas discharge tube 37 has the cathode connected to ground through a suitable measuring instrument 38, and has the plate electrode thereof connected to a source of direct current plate potential 12 through a pair of switch contacts 14 that are actuated by the cam 16 and cam rider 15.

In operation, the cam-operated switch is closed to charge the first capacitor 11 to the full value of the electric potential $V_0$, through the contacts 13 which by proper design of the recession in the surface of the cam 16, are maintained closed for a sufficient period of time to assure that the first capacitor is charged to the full value of the potential of $V_0$. Subsequently, during each cycle of operation of cam 16, the contacts 13 are separated, and the movable switch arm 24 sequentially connects the second capacitor 21 across the first capacitor 11, and simultaneously, the movable switch arm 25 sequentially connects the third capacitor 32 across the voltage source 31 at a frequency of $f$ cycles per second. The switching means then uncouples the second and third capacitors 21 and 32 from the capicitor 11 and the voltage source 31, respectively and couples them in series circuit relationship through the interconnections between the fixed contacts 27 and 27'. When the second and third capacitors are thus connected in series circuit relationship, they form a differential capacitance voltage divider wherein the voltage appearing across each of the capacitors is respectively representative of the potential remaining across the first capacitor at any time $t$ during its exponential decay, and the value $V_g$ of the source of reference potential. This voltage divider is then coupled to the output circuit 22, after which the movable switch arms 24 and 25 again return to fixed contacts 26 and 26' respectively, to repeat the cycle. During each cycle of operation of the switching means 23 the resistor 34 serves to dissipate the charge built up on capacitor 32 which is representative of that on capacitor 11 to develop an electric signal for application to the control grid of device 22 which controls the conduction thereof. The plate potential of discharge device 22 then varies in accordance with the charge on capacitor 21, and maintains the potential applied to the control grid of gas discharge tube 37 below the cutoff point. By making the switching rate of the switching means 23 relatively fast in comparison to the rate at which the first capacitor 11 is charged by cam 16, the second capacitor 21 will act as a small resistance, and the above-described operation will result in incrementally discharging the first capacitor 11 along an exponential discharge characteristic. Hence, the value of the positive signal applied to the control grid of discharge device 22 is made to decrease exponentially over a series of operations of switching means 23 until it attains a sufficiently low value to overcome the biasing potential 36 whereupon its anode potential rises applying a positive going voltage to the control grid of gas discharge device 37 making it conductive.

Figure 2:
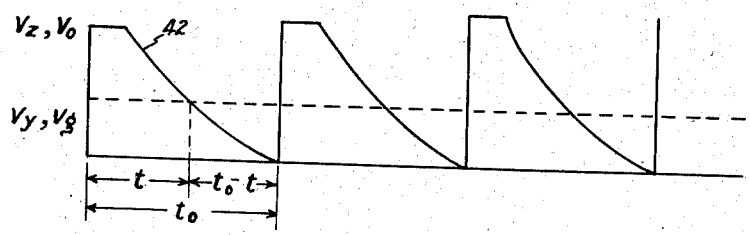
Fig. 2 is a graph of the charging and discharging voltage vs. time characteristic of an energy storage device comprising an element of the logarithmic translating circuit illustrated in Fig. 1.

Referring now to Fig. 2, it is shown that at time $t=0$, the first capacitor 11 is charged to the unknown potential $V_0$ upon the closing of the switch upon contacts 13.

Thereafter, the charge on capacitor 11 is dissipated in discrete amounts $\Delta V$ during each of the operations of the switching means 23 which serves to couple and decouple the second capacitor 21 and the first capacitor 11 at a frequency of $f$ cycles per second. At time $t=0$ the charge of capacitor 11 is given by:

(1) $$q_0 = V_0 C$$

where C is the value of capacitance of capacitor 11.

After capacitor 11 has been charged to the value $q_0$, the switching means 23 first connects capacitor 21 to 11, and thereafter disconnects them. Thus capacitor 21 is first charged to the same potential as capacitor 11, and then discharged to zero through resistor 34. Prior to closing arm 24 on contact 26, the charge of capacitor 11 at any time $t$ is given by:

(2) $$q = VC$$

Immediately after arm 24 and contact 26 are closed, the quantity $q$ is unchanged, and is given by the relation:

(3) $$q = VC = (V + \Delta V)(C + C_1)$$

where the value $(V + \Delta V)$ in the right-hand term of the expression is slightly less than the value V in the left-hand term. The change in potential $\Delta V$ during each cycle of operation of switching means 23 is then given by the relation:

(4) $$\Delta V = -\left(\frac{C_1}{C + C_1}\right) V = \left(-\frac{C_1 V}{C + C_1}\right)$$

If the change in potential $\Delta V$ occurs $f$ times per second, then, assuming that the steps $\Delta V$ are sufficiently small, the change in potential per second may be obtained from the relation:

(5) $$\frac{\Delta V}{\Delta t} = \frac{dV}{dt} = \frac{-fC_1 V}{C + C_1}$$

By separating the variable factors V, $dV$ and $dt$ into two equalities, inserting the relations thus obtained into two equal integral expressions, and providing the same with suitable limits, the following relation results:

(6) $$\int_{v_0}^{v} \frac{dV}{V} = \frac{-FC_1}{C + C_1} \int_0^t dt$$

Solving Equation 6, and substituting in the limits results in:

(7) $$V = V_0 e^{\frac{-FC_1 t}{C + C_1}} = V_0 e^{-Kt}$$

where $$K = \frac{fC_1}{C + C_1}$$

or (8) $$Kt = \ln V_0 - \ln V$$

Referring now to Fig. 2 of the drawings, curve 42 represents the amplitude curve of the voltage appearing across first capacitor 11 at any time $t$ during the exponential discharge of the first capacitor through second capacitor 21 within one time period to which is determined by the time constant of the synthetic RC circuit formed by capacitor 11, capacitor 21, and switching means 23. If at time $t$ the exponentially decaying voltage V across the first capacitor 11 equals or overcomes the bias voltage $V_g$ of source 31, and the output circuit 22 is adjusted so that a constant amplitude output current is produced upon the exponentially decaying voltage V becoming equal to the bias voltage $V_g$, it can be shown from Equation 8 that the average current flowing in the output circuit 22 is proportional to the logarithm of the voltage $V_0$. By rewriting Equation 8 in the following manner:

(9) $$t = K_1 \ln V_0 - K$$

where $$K_1 = \frac{1}{K} \text{ and } K_2 = \frac{1}{K}$$

then multiplying all of the terms of Equation 9 by the factor $$\frac{1}{t_0}$$

the following equation can be derived:

(10) $$\frac{K_1 \log V_0}{t_0} + \frac{K_2 \log V}{t_0} = \frac{t}{t_0}$$

Since at time $t$, $V = V_g$, by inspection of Equation 10 it is seen that the last term of the left-hand side of the equation is constant and consequently can be replaced by a constant term $K_3$; and that the multiplier of the logarithm of $V_0$ is likewise a constant term, and can be replaced by a second constant $K_4$. Therefore, Equation 10 can be expressed in the following manner:

(11) $$\frac{t}{t_0} = K_3 + K_4 \log V_0$$

Adverting again to Fig. 2 of the drawings, it is apparent that if the output circuit 22 is a constant current device, and is triggered at time $t$, then the average current flowing in the output circuit is given by:

(12) $$I_{av} = I_m \left(\frac{t_0 - t}{t_0}\right)$$

From a consideration of Equations 11 and 12, and the fact that the ratio $$\frac{t}{t_0}$$

is the complement of the ratio $$\frac{t_0 - t}{t_0}$$

it is apparent that the current $I_{av}$ flowing in the output circuit 22 is proportional to the logarithm of the single variable input signal $V_0$. It should be noted that at no time while this logarithmically related output signal is being developed, is the output circuit 22 directly coupled across the first capacitor 11. Consequently the output circuit has no loading effect on the exponential discharge characteristic of the capacitor which would tend to affect the exponential character of the discharge deleteriously. This feature allows the signals applied to the input of the output circuit 22 to follow along a true exponential decay characteristic, and therefore results in the production of an output signal which is truly proportional to the logarithm of the value of the signal applied to the input of the circuit. In addition, the value of the circuit as a logarithmic translating device is further enhanced by the fact that it is a relatively inexpensive and simple-to-construct circuit arrangement mainly utilizing standardized and readily available components.

A second logarithmic translating system constructed in accordance with the invention is illustrated in Fig. 4, and is designed for use with three varying electric signals $V_x$, $V_z$ and $V_y$ that have been obtained, and from which it is desired to derive electrical output signals indicative of two different phenomena, for example, illumination and attenuation, that occur within the area from which the signals $V_x$, $V_y$ and $V_z$ are obtained. If, from a knowledge of basic physics and the manner in which the signals were obtained, it is known that the relation $$\log V_x + \log V_z - \log V_y$$

is an expression for the illumination in the area in question, and that the relation: $\log V_z - \log V_y$ is an expression for the attenuation occurring within the area, then, with the logarithmic translating system shown in Fig. 4, it is possible to derive the desired logarithmically related output signals. This logarithmic translating system is comprised of a first logarithmic translating channel 44, and a second logarithmic translating channel 45. The first logarithmic translating channel 44 is similar in construction to the logarithmic translating circuit shown in Fig. 1, differing only in that $V_g$ is replaced by a varying unknown signal $V_y$ and hence, component elements of the channel 44 have been given the same reference numeral as corresponding elements of the Fig. 1 circuit, while the second logarithmic channel 45 differs from the first logarithmic translating channel 44 and the Fig. 1 circuit, only in that a known value of potential $V_k$ is connected across the charging circuit including switch contacts 13 and the first energy storage device comprising capacitor 11, in place of the source of unknown potential $V_z$ in channel 44, and the unknown signal $V_x$ is connected to the fixed contact 26' in place of the fixed reference voltage $V_g$. Other than these differences noted above, the two logarithmic translating channels are entirely similar to, and operate in the same manner as the circuit shown in Fig. 1.

Figure 3:
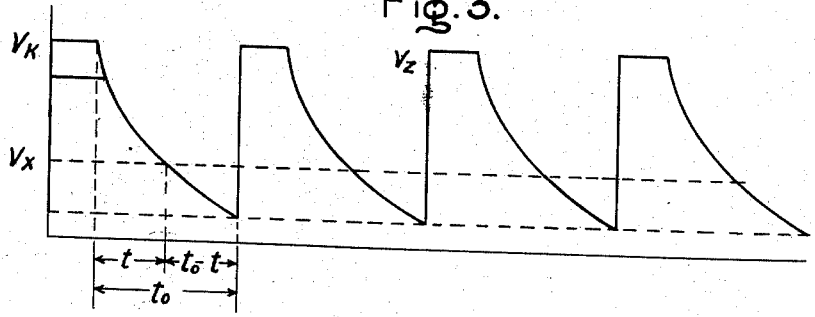
Fig. 3 is a greatly magnified graph of the exponentially varying charging and discharging voltage vs. time characteristic curve illustrated in Fig. 2.

Referring now to Fig. 3 of the drawings, the voltage-time relationships of the transient phenomena occurring in the second logarithmic translating channel 45, are disclosed, and from an examination of Equation 8, together with Fig. 3, it can be seen that:

(13) $$Kt = 1nV_k - 1nV_x$$

Since $V_k$ is known, Equation 13 may be written:

(14) $$t = K - K1nV_x$$

and with substantially the same argument that was used in explaining Equation 12, it can be shown that the average current flowing in the output circuit 22 of the second logarithmic translating channel 45 is proportional to the logarithm of the input signal $V_x$.

Adverting again to Fig. 2 of the drawings, by replacing the reference characters $V_0$ and $V_g$, with the characters $V_z$ and $V_y$, respectively, the graph of the voltage-time characteristics of the first logarithmic translating channel is obtained. By making the same substitution in Equation 8, an expression for the transient phenomena occurring in the first logarithmic translating channel can be obtained, and is given by:

(15) $$Kt = 1nV_z - 1nV_y$$

Then, again using essentially the same argument presented in developing Equation 12, it can be shown that the average current flowing in the output circuit 22 of the first logarithmic translating channel 44 is proportional to the difference in the logarithm of the input signal $V_z$ minus the logarithm of the input signal $V_y$.

If each of the gas discharge devices 37 are designed so that they are essentially constant current devices, the current produced in the plate load thereof will be proportional to the logarithm of the applied input voltages in accordance with Equations 14 and 15. By combining the output signals of each of the translating channels, then, through the medium of a pair of pulse transformers 46 and 47 having the primaries thereof coupled to the plates of the normally non-conductive gas discharge devices 37 in each of the channels 44 or 45, respectively, and having the secondaries thereof connected in parallel, an output signal can be derived from the overall logarithmic translating system which is representative of the logarithm of the combined values of the signals applied to the input of the system.

By reason of the above-described construction, the logarithmic translating system of Fig. 4 incorporates all of the advantages of the circuit illustrated in Fig. 1, and in addition, is capable of reliable operation over a substantial period of time. This latter advantage is brought about by reason of the characteristic ability of the circuit to maintain its adjusted sensitivity in spite of aging, or other factors tending to affect the response of the output detector portions (such as 33, 37) of the circuit deleteriously and generally designated as "drift." The primary difficulty encountered by reason of drifting of the output detector portions of the circuit is the identification of equality between two signals, such as $V_0$ and $V_x$, should the logarithmic translating channel be required to cover a range of about 3 decades extending, for example, from 20 millivolts to 20 volts. In such event, the output circuit of the translating channel must be stable to within 1 millivolt for approximately 5% accuracy. In view of the fact that the ordinary electron discharge tubes, such as 33, have a drift which is much larger than the minimum allowed, it would be practically impossible to cover such a range of voltages with the previously known logarithmic translating circuits. However, with applicant's new and improved logarithmic translating circuit, the pulsed nature of the signal applied to the control grid of the electron discharge tube 33 allows an arrangement such as that shown in Fig. 4 to be used, wherein a coupling capacitor 48 is inserted in the coupling between tube 33 and gas discharge tube 37. Gradual increases or decreases in the plate voltage of tube 33 due to drift etc., are prevented from falsely tripping gas discharge tube 37 prior to the condition of equality being attained, by coupling capacitor 48, and thereby reduces the possibility of obtaining a false response from the circuit.

In order to derive a permanent record of the outputs of the logarithmic translating system described above, the respective parallel coupled secondaries of the pulse transformers 46 and 47, are connected to the input of a helix recorder indicated at 49. The helix recorder 49 includes an elongated electrically conductive bar 51 electrically connected to the parallel connected secondaries of the pulse transformers 46 and 47, and spaced above a rotatable drum 52. The rotatable drum 52 is rotated by a motor 53 at a relatively slow speed, for example 4 to 10 revolutions per second, may be constructed of electric insulating material and has a helix 54 formed thereon of an electrically conductive material. The helix 54 is designed in a manner such that, as the drum 52 rotates, the point of coincidence of the helix and the elongated conductive bar 51 moves from the right to the left end of the bar during one revolution and cyclically repeats this movement during subsequent revolutions of the drum. The motor 53 also drives the rotatable cams 16 of both the first and second translating channels through a mechanical connection indicated by the dotted lines 55 so that the rotatable cams 16 are rotated in synchronism with the drum 52. Also, the depressions in the surface of the rotatable cams 16 are located so that the closing of the switch contacts 13 occur when the right hand ends of the helix 54 and the conductive bar 51 are in juxtaposition. Thus, by correlating the speed of rotation of motor 53 and therefore helix 54 with the period of discharge of the first energy storage devices 11, the point of coincidence of the helix 54 can be made to move from the right to left in coincidence with the exponential discharge of the first energy storage devices. Consequently, when $V_x$ in the second logarithmic translating channel 45 equals $V_k$, a pulse will occur in the secondary of transformer 47 in accordance with the previously described operation, and results in the production of a spark across the gap between elongated electrically conductive bar 51 and the point of coincidence of the electrically conductive helix 54. Likewise, when $V_z$ is equal to $V_y$, a signal will be produced in the secondary of transformer 47 of the second logarithmic translating channel which will produce a spark between the electrically conductive elongated bar 51, and the point on helix 54 then in coincidence with the elongated bar. Hence, if a strip of electrically sensitive paper such as that known by the trade name "Teledeltos," or some other similar electrically sensitive recording material is caused to run between elongated bar 51 and rotatable drum 52 at a suitable speed correlated with the rotation of the drum 52 a permanent record (such as is shown in Fig. 5 of the drawings) of the logarithm of the combined values of the input signals $V_x$, $V_y$ and $V_z$ can be obtained.

In order to sensitize the logarithmic translating channels 44 and 45 at the beginning of each rotation of drum 52, the plate electrodes of each of the normally non-conductive gas discharge devices 37 of each translating channel, are coupled through a pair of switches 56 and 57 to the source of potential $V_0$ which serves as a plate supply for each of these devices. The switches 56 and 57 are constructed in such a manner that they are normally closed during the greater part of the rotation of the cams 16, but are opened to interrupt the plate supply to each of the gas discharge devices 37 simultaneously with the closing of the switch contacts 13. Consequently, each time that the first electrical energy storage devices 11 are charged, conduction through the discharge devices 37 is interrupted. Subsequently, the switches 56 and 57 are closed upon contacts 13 being opened, but neither of the discharge devices 37 is again rendered conductive until such time that the exponentially decaying voltage across its associated first energy storage device equals the applied input signal $V_x$ or $V_y$. Further, for the purpose of assuring that the spark discharge over the gap between the bar 51 and helix 54 is of sufficient intensity to permanently mark the "Teledeltos" paper, or other recording medium, a pair of energy storage device comprising capacitors 58 and 59 having relatively large capacitances are connected in parallel with the primary windings of the pulse transformers 46 and 47, respectively. The capacitors 58 and 59 are charged by the source of potential $V_k$ through switch contacts 56 and 57, simultaneously with the energization of the gas discharge device 37 with which it is associated. By this construction, upon either of the gas discharge devices 37 being rendered conductive, the associated capacitor 58 or 59 is discharged therethrough, and through the primary winding of the respective pulse transformer 46 or 47 to thereby produce a high intensity spark discharge across the above-mentioned gap.

By reason of the above-described construction, upon the condition of equality occurring in either channel, a pulsed current will flow in the output of the respective logarithmic translating channel which is representative of the logarithm of the signal applied to the input of that respective channel during any particular discharge period of the first capacitors 11, and over a series of such discharge periods, a continuous curve will be traced out in the manner shown in Fig. 5. The desired logarithmic relation can then be easily obtained from the record by measuring the distance of the mark produced by the spark from the logarithmic translating channel to which $V_x$ was applied, in order to obtain the value of log $V_x$, and the value of the log $V_z$ − log $V_y$ can be similarly obtained. In interpreting the record of Fig. 5 however, it should be noted that the logarithm of $V_x$ is obtained by measuring the distance of the mark produced by $V_x$ from the left end of the recording paper, and the value of the logarithm of log $V_z$ − $V_y$ is obtained by measuring the distance of the mark produced thereby from the right end of the recording paper. The sum of the two indications can then be readily obtained from a proper combination of the values thus derived.

From the foregoing description, it can be readily appreciated that the invention provides a new and improved logarithmic translating circuit for producing output signals which are true logarithmic reproductions of the signals applied to the input of the circuit. This feature is obtained by reason of the provision of a means incrementally discharging an energy storage device having an exponential discharge characteristic through a second electrical energy storage device having a relatively small capacity with relation to the first storage device, and having little or no loading effect on the first energy storage device which would tend to throw the circuit off from a true logarithmic response. A logarithmic translating circuit constructed in accordance with the invention can be so designed that aging or other factors tending to impair the sensitivity of the circuit, have very little or no effect on the response and variation of the circuit. In addition to the above, the logarithmic translating circuit provided by applicant is relatively simple and inexpensive to construct, and can be readily incorporated into systems for deriving the logarithm of the combined value of a number of signals applied to its input.

Obviously, other modifications and variations of the present invention are possible in the light of the above teachings. It is therefore to be understood that changes may be made in the invention described herein, which are within the full intended scope of the invention as defined by the appended claims.

What I claim as new and desire to secure by Letters Patent of the United States is:

1. A logarithmic translating system for obtaining the combined value of the logarithm of at least three varying electric signals, said system including at least a first and a second logarithmic translating channel, each of said channels comprising a first capacitor having a relatively large capacitance, means for cyclically charging the first capacitor associated with said first translating channel to a selected electric potential, means for cyclically charging the first capacitor associated with said second translating channel to an electric potential equal to the instantaneous value of one of the three varying electric signals to be combined, a second capacitor in each of said channels, said second capacitor having a comparatively small capacitance with relation to said first capacitor, an output circuit in each of said translating channels including a normally non-conductive electron discharge device biased to be rendered conductive upon an electric signal applied to the input thereof reaching a predetermined level, mechanically operable switching means in said first channel for cyclically coupling the second capacitor thereof in circuit relationship with its associated first capacitor and sequentially to operatively uncouple said first and second capacitors and couple said second capacitor in circuit relationship with a point maintained at the instantaneous value of one of the remaining electric signals to be combined and with the input of the respective first channel output circuit, mechanically operable switching means in said second channel for cyclically coupling the second capacitor thereof in circuit relationship with its associated first capacitor and sequentially to operatively uncouple said first and second capacitors and couple said second capacitor in circuit relationship with a point maintained at the instantaneous value of the last remaining electric signal to be combined and with the input of the respective first channel output circuit, both of said switching means being operated at a frequency substantially greater than the frequency at which said first capacitors are cyclically charged, and a common output circuit coupled to the output circuits of both said first and second channels for reading the difference in the energies connected thereto.

2. A logarithmic translating circuit including in combination a first energy storage device including at least a first capacitor having a relatively large capacitance, periodic means for charging said first energy storage device including said capacitor to a selected potential level, a second energy storage device including at least a second capacitor having a comparatively small capacitance relative to said first capacitor, a pair of input terminals adapted to be supplied with a source of energy to be compared, an output circuit responsive to a predetermined level of potential, switching means for cyclically coupling said second energy storage device including said capacitor in circuit relationship with said first energy storage device including said capacitor to reduce the potential level thereon incrementally along an exponential characteristic and alternately to couple said second energy storage device including said capacitor in circuit relationship with said input terminals and the input of said output crcuit, said switching means operating at a frequency substantially greater than the frequency of operation of the periodic means for charging the first energy storage device including said capacitor.

3. A logarithmic translating circuit for obtaining the logarithm of the combined value of at least two electrical signals including in combination a first capacitor having a relatively large capacitance, periodic means for coupling said first capacitor to one of said signals and charging it to a potential proportional to the amplitude of said signal, a second capacitor having a comparatively small capacitance relative to said first capacitor, an output circuit responsive to a predetermined potential level, a pair of terminals adapted to be supplied with the remaining of the electrical signals to be combined, switching means for cyclically coupling said second capacitor in circuit relationship with said first capacitor to discharge said first capacitor incrementally along an exponential characteristic and sequentially to uncouple said first and second capacitors and couple said second capacitor in circuit relationship with said input terminals and the input of said output circuit, said switching means being operated at a frequency substantially greater than the frequency of operation of said first energy storage device.

4. A logarithmic translating circuit including in combination a first capacitor having a relatively large capacitance, periodic means charging said first capacitor to a selected value of potential, a second capacitor having a comparatively small capacitance relative to said first capacitor, a pair of input terminals adapted to have a signal applied thereto which is to be compared to the exponentially varying potential values obtained during the discharge of said first capacitor, an output circuit responsive to a predetermined level of potential, a mechanically operable switching means for cyclically coupling said second capacitor in circuit relationship with said first capacitor whereby the potential level is reduced incrementally along an exponential characteristic and sequentially to operatively uncouple said first and second capacitors and couple said second capacitor in circuit relationship with said terminals and with the input of said output circuit, said switching means being operated at a frequency substantially greater than the frequency at which said first capacitor is charged.

5. A logarithmic translating circuit including in combination a first capacitor having a relatively large capacitance, periodic means charging said first capacitor to a selected potential, a second capacitor having a comparatively small capacitance relative to said first capacitor, a pair of terminals adapted to have applied thereto a potential to be compared to the exponentially varying potential values obtained during the discharge of said first capacitance, an output circuit including a normally nonconductive electron discharge device biased to be rendered conductive upon the application to the input thereof of a potential of a predetermined level, mechanically operable switching means for cyclically coupling said second capacitor in parallel circuit relationship with said first capacitor to reduce the potential thereon incrementally along an exponential characteristic and sequentially to uncouple said first and second capacitors and couple said second capacitor in circuit relationship with said terminals and the input of said output circuit, said switching means being operated at a frequency substantially greater than the frequency at which said first capacitor is charged.

6. A logarithmic translating circuit including in combination a first capacitor having a relatively large capacitance, periodic means for charging said first capacitor to a selected potential level, a second capacitor having a comparatively small capacitance relative to said first capacitor, a pair of input terminals adapted to have a signal to be compared applied thereto, a third capacitor having a capacitance substantially equal to that of said second capacitor, an output circuit responsive to a selected level of potential, and switching means for cyclically coupling said second capacitor in circuit relationship with said first capacitor to reduce the potential thereon incrementally along an exponential characteristic, and for coupling said third capacitotr in circuit relationship with said input terminals, said switching means being operated thereafter to uncouple said second and third capacitance devices, and sequentially to couple said second capacitor in circuit relationship with said third capacitor and the input of said output circuit.

7. A logarithmic translating circuit including in combination a first capacitor having a relatively large capacitance, periodic means for charging said first capacitor to a selected potential, a second capacitor having a comparatively small capacitance relative to said first capacitor, a pair of terminals adapted to have an electrical signal applied thereto which is to be compared to the varying electrical potentials obtained during the exponential discharge of said first capacitor, a third capacitor having a capacitance substantially equal to that of said second capacitor, an output circuit responsive to a predetermined potential, and switching means for cyclically coupling said second capacitor in circuit relationship with said first capacitor to discharge it incrementally along an exponential characteristic and for coupling said third capacitor in circuit relationship with said input terminals, said switching means being operative thereafter to uncouple said second and third capacitors and sequentially couple said second capacitor in circuit relationship with couple said third capacitor and the input of said output circuit, a predetermined number of times during one discharge period of said first capacitor.

8. A logarithmic translating circuit including in combination a first capacitor having a relatively large capacitance, periodic means for charging said first capacitor to a selected potential, a second capacitor having a capacitance which is comparatively small relative to said first capacitor, a pair of input terminals adapted to have applied thereto an electric signal to be compared to the varying electric potential obtained during the exponential discharge of said first capacitor, a third capacitor having a capacitance substantially equal to that of said second capacitor, an output circuit including a normally nonconductive electron discharge device biased to be rendered conductive by a predetermined potential level applied to the input thereof, mechanically operable switching means for cyclically coupling said second capacitor in circuit relationship with said first capacitor to discharge it incrementally along an exponential characteristic and for coupling said third capacitor in circuit relationship with said input terminals, said switching means being operable thereafter to uncouple said second and third capacitors from said first capacitor and said input terminals respectively and sequentially to couple said second capacitor in circuit relationship with said third capacitor and to the input of said output circuit at a frequency substantially greater than the frequency at which said first capacitor is periodically charged.

9. A logarithmic translating system for obtaining the combined value of the logarithm of at least three varying energy values, said system including at least a first and second logarithmic translating channel, said first channel comprising an energy storage device having a relatively large magnitude, periodic means to charge said storage device to a first stored energy level, means to discharge said first storage device incrementally along an exponential characteristic and periodically compare the instantaneous energy level of said device with one of the energy values, an output circuit responsive to a predetermined energy level, and means to apply said comparison energy level to the input of said output circuit, said second channel comprising an electrical storage device having a relatively large capacitance, input terminals for periodically charging the storage device of said second channel to a level proportional to the instantaneous value of one of the remaining energy values to be combined, means to discharge said storage device in said second channel incrementally along an exponential characteristic and continuously comparing the instantaneous energy level thereof with the remaining energy value, an output circuit responsive to a predetermined energy level and means to apply said compared energy level to the input of the output circuit, and a common output circuit coupled to the respective output circuits of said first and second channels for reading the difference in the energy connected thereto, the means in said first and second channels for discharging and comparing operating at a frequency substantially greater than the frequency of the periodic means for charging the storage devices in said channels.

References Cited in the file of this patent

UNITED STATES PATENTS

| | | |
|---|---|---|
| 2,228,883 | Morgan | Jan. 14, 1941 |
| 2,313,666 | Peterson | Mar. 9, 1943 |
| 2,600,423 | Nolle | June 17, 1952 |
| 2,662,213 | Vanderlyn | Dec. 8, 1953 |